US010565922B2

(12) United States Patent
Huang et al.

(10) Patent No.: US 10,565,922 B2
(45) Date of Patent: Feb. 18, 2020

(54) DISPLAY PANEL AND DISPLAY WALL

(71) Applicant: AU OPTRONICS CORPORATION, Hsin-chu (TW)

(72) Inventors: Sheng-Miao Huang, Hsin-chu (TW); Yu-Sheng Huang, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 114 days.

(21) Appl. No.: 15/596,419

(22) Filed: May 16, 2017

(65) Prior Publication Data
US 2018/0122288 A1 May 3, 2018

(30) Foreign Application Priority Data
Oct. 28, 2016 (TW) .............................. 105135079 A

(51) Int. Cl.
G09G 3/36 (2006.01)
G02F 1/1333 (2006.01)
G09G 3/20 (2006.01)
G06F 3/14 (2006.01)

(52) U.S. Cl.
CPC ......... G09G 3/2092 (2013.01); G06F 3/1446 (2013.01); G09G 3/3648 (2013.01); *G02F 1/13336* (2013.01); *G02F 2001/133388* (2013.01); *G02F 2001/133391* (2013.01); *G09G 2300/026* (2013.01); *G09G 2300/0408* (2013.01); *G09G 2310/0232* (2013.01)

(58) Field of Classification Search
None
See application file for complete search history.

(56) References Cited

U.S. PATENT DOCUMENTS

| 5,396,261 A | 3/1995 | Hastings, III |
| 7,239,367 B2 | 7/2007 | Jin et al. |
| 7,633,473 B2 | 12/2009 | Uh et al. |
| 9,959,827 B2 | 5/2018 | Song et al. |
| 2006/0001796 A1 | 1/2006 | Chang et al. |

(Continued)

FOREIGN PATENT DOCUMENTS

| CN | 104007575 A | 8/2014 |
| CN | 104238214 A | 12/2014 |

(Continued)

OTHER PUBLICATIONS

Extended European Search Report issued by the European Patent Office (EPO) dated Apr. 3, 2018 for EP3316246.

(Continued)

*Primary Examiner* — Andre L Matthews
(74) *Attorney, Agent, or Firm* — Tim Tingkang Xia, Esq.; Locke Lord LLP

(57) ABSTRACT

A display panel includes a substrate, a plurality of pixels, and a black matrix. The pixels are disposed on the substrate. The black matrix is disposed between the pixels. The black matrix includes a first sub-portion, a second sub-portion, and a third sub-portion. The first sub-portion, the second sub-portion, and the third sub-portion are disposed side by side. The first sub-portion has a first width, the second sub-portion has a second portion, and the third sub-portion has a third width. The first width, the second width, and the third width are in an ascending order.

9 Claims, 9 Drawing Sheets

(56) References Cited

U.S. PATENT DOCUMENTS

| | | | |
|---|---|---|---|
| 2007/0085862 A1* | 4/2007 | Moriya | G09G 3/2003 345/694 |
| 2015/0097837 A1 | 4/2015 | Jepsen et al. | |
| 2015/0198831 A1* | 7/2015 | Kim | G02F 1/13336 345/1.3 |
| 2015/0302808 A1* | 10/2015 | Wang | G02F 1/1335 345/691 |
| 2016/0093244 A1 | 3/2016 | Kazmierski et al. | |
| 2017/0020008 A1 | 1/2017 | Tsai et al. | |
| 2017/0169779 A1* | 6/2017 | Song | G02F 1/133512 |

FOREIGN PATENT DOCUMENTS

| | | |
|---|---|---|
| CN | 104865737 A | 8/2015 |
| TW | 201003263 A | 1/2010 |

OTHER PUBLICATIONS

Office Action issued by (TIPO) Intellectual Property Office, Ministry of Economic Affairs, R. O. C. dated Mar. 6, 2017 for Application No. 105135079, Taiwan.

Office Action issued by the State Intellectual Property Office of the Peoples Republic of China dated Dec. 5, 2018 for Application No. CN201611070730.4.

\* cited by examiner

DISPLAY PANEL AND DISPLAY WALL

CROSS-REFERENCE TO RELATED PATENT APPLICATION

This application claims the benefit of priority to Taiwan Patent Application No. 105135079, filed Oct. 28, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relate to a display panel and a display wall.

BACKGROUND

To meet various modern requirements on image frames, technologies of display apparatuses continue to be innovated. For example, by means of forming a display wall with a plurality of display panels, a display apparatus with a size greater than a size of a display panel can be formed. Further, the number of display panels may be increased according to requirements, and therefore, a size of a display wall may be increased according to requirements.

To further improve features of display apparatuses, the related art painstakingly develops the display apparatuses. How a display apparatus having preferred features may be provided is one of the current research and development issues, and is an object to be achieved in the related art.

SUMMARY

Specific embodiments of the present invention provide a display panel, so as to enable electronic elements on a substrate to be configured more flexibly.

According to an implementation of the present invention, a display panel comprises a substrate, a plurality of pixels, and a black matrix. The pixels are disposed on the substrate. The black matrix is disposed between the pixels. The black matrix comprises a first sub-portion, a second sub-portion, and a third sub-portion, the first sub-portion, the second sub-portion, and the third sub-portion are disposed side by side, the first sub-portion has a first width, the second sub-portion has a second width, the third sub-portion has a third width, and the first width, the second width, and the third width are in an ascending order.

In one or more implementations of the present invention, the substrate has an edge, a first distance exists between the first sub-portion and the edge, a second distance exists between the second sub-portion and the edge, a third distance exists between the third sub-portion and the edge, and the first distance, the second distance, and the third distance are in a descending order.

In one or more implementations of the present invention, the display panel further comprises an integrated circuit. The integrated circuit is disposed on the substrate, and disposed below the first sub-portion, the second sub-portion, or the third sub-portion, wherein the integrated circuit is electrically connected to at least one of the pixels.

In one or more implementations of the present invention, the substrate has an edge, the pixels comprise a plurality of first row pixels, a plurality of second row pixels, and a plurality of third row pixels, the first row pixels, the second row pixels, and the third row pixels are disposed side by side, a fourth distance exists between the first row pixels and the edge, a fifth distance exists between the second row pixels and the edge, a sixth distance exists between the third row pixels and the edge, the fourth distance, the fifth distance, and the sixth distance are in a descending order, the first row pixels are disposed at one side of the first sub-portion, the second row pixels are disposed at one side of the second sub-portion, the third row pixels are disposed at one side of the third sub-portion, the first row pixels have a fourth width, the second row pixels have a fifth width, the third row pixels have a sixth width, and the fourth width, the fifth width, and the sixth width are in an ascending order.

In one or more implementations of the present invention, aperture ratios of the first row pixels, the second row pixels, and the third row pixels are the same.

According to another implementation of the present invention, a display panel comprises a substrate and a plurality of pixels. The substrate has an edge. The pixels are disposed on the substrate, wherein the pixels comprise a plurality of first pixels, a plurality of second pixels, and a plurality of third pixels, a first distance exists between the first pixels and the edge, a second distance exists between the second pixels and the edge, a third distance exists between the third pixels and the edge, the first distance, the second distance, and the third distance are in a descending order, the first pixels have a first width, the second pixels have a second width, the third pixels have a third width, and the first width, the second width, and the third width are in an ascending order.

In one or more implementations of the present invention, the first pixels are pixels in all the pixels nearest to the edge.

In one or more implementations of the present invention, the display panel further comprises a black matrix. The black matrix is disposed between the pixels, wherein the black matrix comprises a first portion, a second portion, and a third portion, a fourth distance exists between the first portion and the edge, a fifth distance exists between the second portion and the edge, a sixth distance exists between the third portion and the edge, the fourth distance, the fifth distance, and the sixth distance are in a descending order, the first portion is disposed at one side of the first pixels, the second portion is disposed at one side of the second pixels, the third portion is disposed at one side of the third pixels, the first portion has a fourth width, the second portion has a fifth width, the third portion has a sixth width, and the fourth width, the fifth width, and the sixth width are in an ascending order.

In one or more implementations of the present invention, the display panel further comprises an integrated circuit. The integrated circuit is disposed on the substrate, and disposed below the first portion, the second portion, or the third portion, wherein the integrated circuit is electrically connected to at least one of the pixels.

In one or more implementations of the present invention, the integrated circuit is a gate driver or a data driver, the gate driver is configured to provide pulses for the pixels to enable and update the pixels, and the data driver is configured to provide, when the pixels are updated, pixel data corresponding to the pixels.

In one or more implementations of the present invention, the display panel has a bezel area, the bezel area has a seventh width, and the seventh width is about a half of the sixth width.

In one or more implementations of the present invention, the first portion is L-shaped, the second portion is L-shaped, and the third portion is L-shaped, and two arms of each L have a same width.

In one or more implementations of the present invention, aperture ratios of the first pixels, the second pixels, and the third pixels are the same.

According to still another implementations of the present invention, a display comprises the foregoing display panels, wherein the display panels are arrayed to form the display.

In the foregoing implementations of the present invention, by means of enabling a first width, a second width, and a third width to be in an ascending order, naked eyes can hardly distinguish differences between different portions of a black matrix. Meanwhile, widths of a first sub-portion, a second sub-portion, and a third sub-portion are greater than a general width of the black matrix, and therefore, an electronic element with a relatively large volume (for example, an integrated circuit) can be disposed below the first sub-portion, the second sub-portion, or the third sub-portion without affecting a display effect, thereby enabling electronic elements on a substrate to be configured more flexibly. Meanwhile, many electronic elements can be configured below the first sub-portion, the second sub-portion, or the third sub-portion, and therefore, the many electronic elements do not have to be disposed on a bezel of a display panel, so that the display panel may be implemented as a narrow bezel display panel or a bezel-less display panel.

Further, in a specific embodiment of the present invention, when display panels are used to form a display, by means of an increase in a width of pixels (for example, third pixels) adjacent to a bezel, a diffraction effect generated by third-pixels adjacent to bezel areas of two adjacent display panels causes difficulties for naked eyes to distinguish a distance between the adjacent display panels. Therefore, because naked eyes can hardly distinguish distances between display panels, the display looks more like an integral portion than a plurality of different divided portions.

BRIEF DESCRIPTION OF THE DRAWINGS

The disclosure will become more fully understood from the detailed description given herein below for illustration only, and thus not limitative of the disclosure, and wherein.

DETAILED DESCRIPTION

Figure 1:
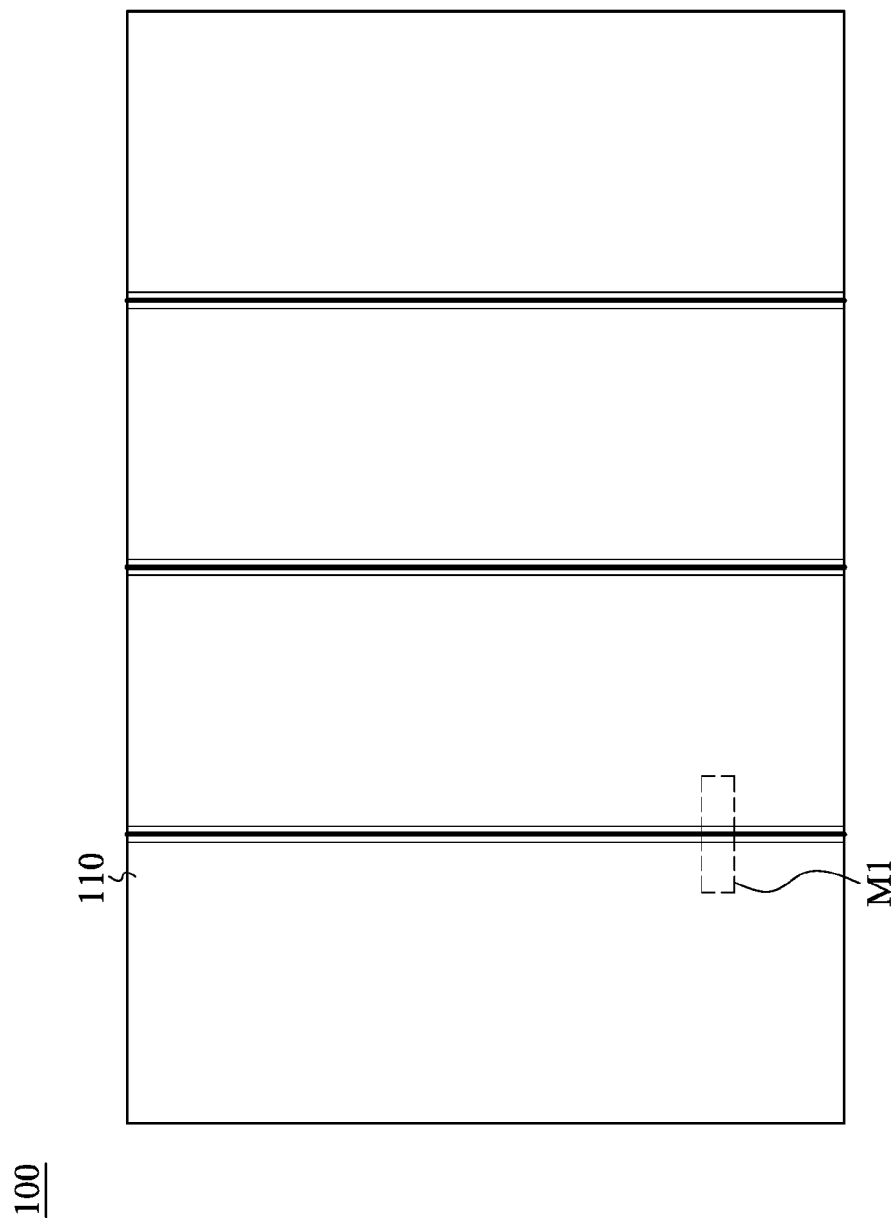
FIG. 1 is a top view of a display panel according to an implementation of the present invention.

A plurality of implementations of the present invention are disclosed below with reference to accompanying drawings. To clarify the description, many practical details are described in the following description. However, it should be understood that these practical details are not intended to limit the present invention. That is, in some implementations of the present invention, the practical details are not necessary. In addition, to simplify the drawings, some conventional structures and elements are schematically illustrated in the drawings.

Figure 2:
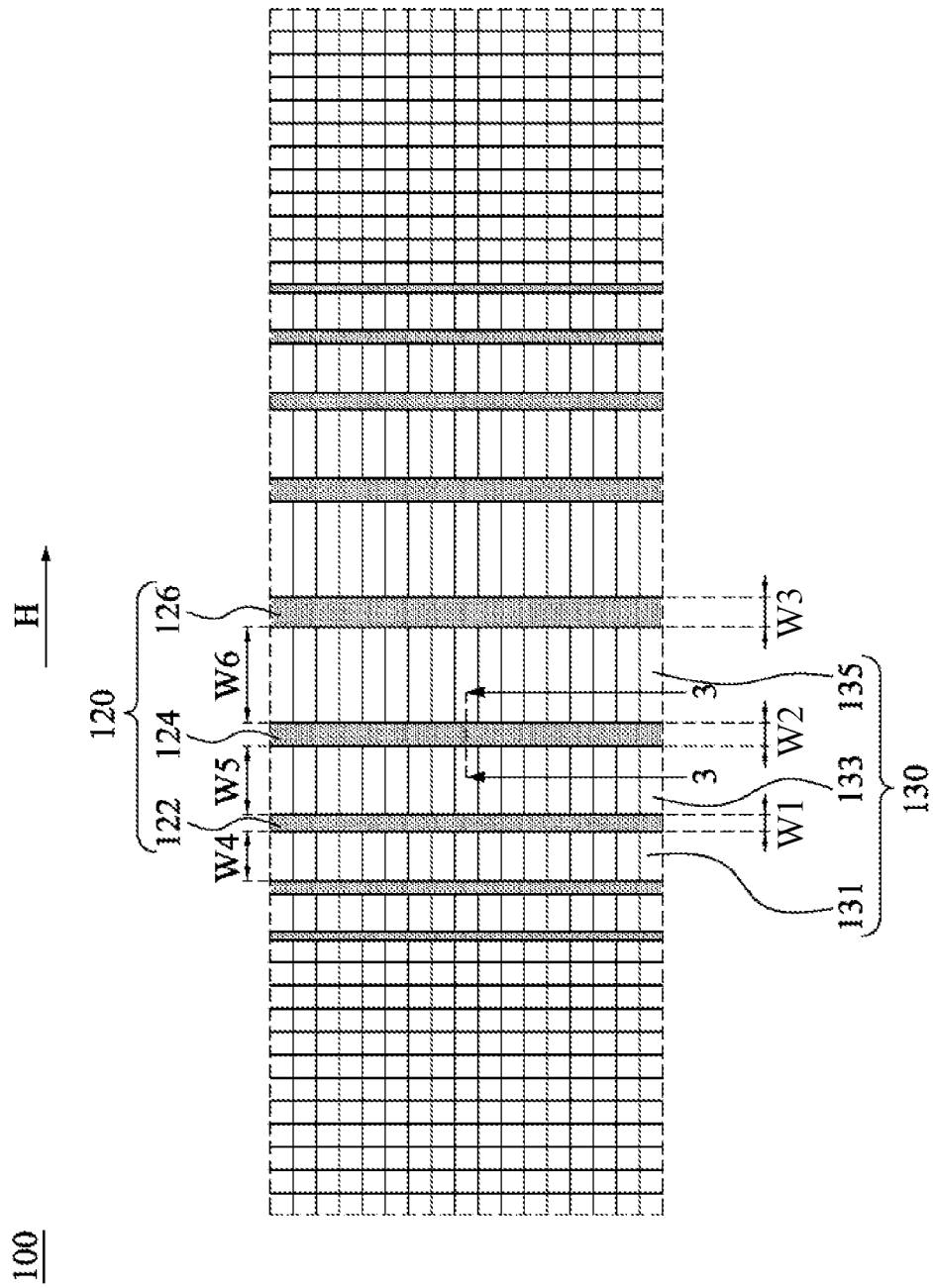
FIG. 2 is a top view of a portion of the display panel according to FIG. 1.

FIG. 1 is a top view of a display panel 100 according to an implementation of the present invention. FIG. 2 is a top view of a portion M1 of the display panel 100 according to FIG. 1. Different implementations of the present invention provide a display panel 100. The display panel 100 may be a narrow bezel display panel or a bezel-less display panel.

As shown in FIG. 1 and FIG. 2, the display panel 100 includes a substrate 110, a plurality of pixels 130, and a black matrix 120. The pixels 130 are disposed on the substrate 110. The black matrix 120 is disposed between the pixels 130. The black matrix 120 includes a first sub-portion 122, a second sub-portion 124, and a third sub-portion 126. The first sub-portion 122, the second sub-portion 124, and the third sub-portion 126 are disposed side by side along a first direction H (the first direction H may be a horizontal direction), the first sub-portion 122 has a first width W1 along the first direction H, the second sub-portion 124 has a second width W2, the third sub-portion 126 has a third width W3. The first width W1, the second width W2, and the third width W3 are in an ascending order. That is, the third width W3 is greater than the second width W2, which is greater than the first width W1. The first sub-portion 122, the second sub-portion 124, and the third sub-part 126 may be sequential adjacent sub-portions, or another sub-portion exists between the first sub-portion 122, the second sub-portion 124, and the third sub-portion 126.

Specifically, the first sub-portion 122, the second sub-portion 124, and the third sub-portion 126 of the black matrix 120 are elongated. It may be understood that the specific implementations of the black matrix 120 described above are merely illustrative, and are not intended to limit the present invention. A person of ordinary skill in the art can flexibly select a specific implementation of the black matrix 120 according to actual requirements.

Figure 3:
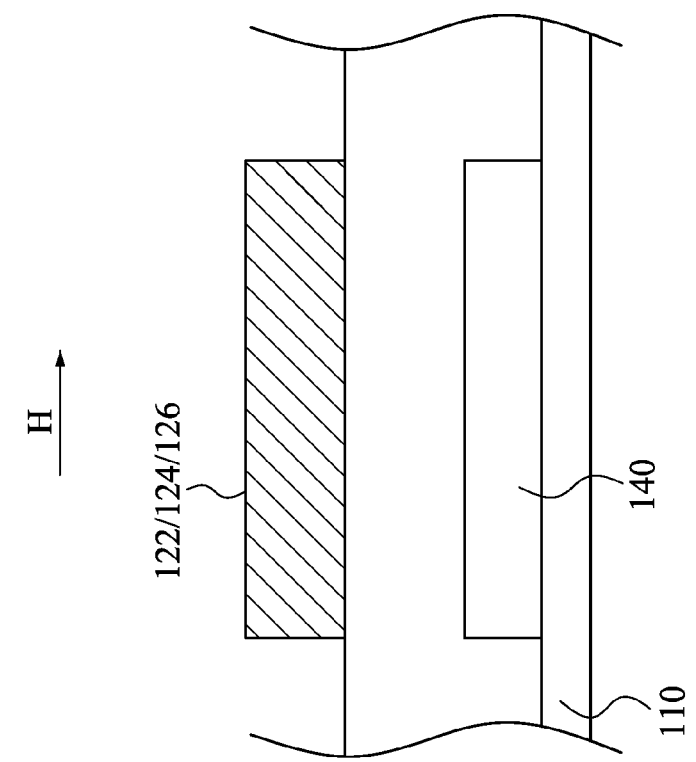
FIG. 3 is a sectional view taking along a line 3 according to FIG. 2.

FIG. 3 is a sectional view taking along a line 3 according to FIG. 2. As shown in FIG. 2 and FIG. 3, the display panel 100 further includes an integrated circuit 140. The integrated circuit 140 is disposed on the substrate 110, and disposed below the first sub-portion 122, the second sub-portion 124, or the third sub-portion 126 (in FIG. 3, the integrated circuit 140 is disposed below the third sub-portion 126). The integrated circuit 140 is electrically connected to at least one of the pixels 130. The term "connected" in the instant specification may include the implementations of directly or indirectly connected.

Figure 5:
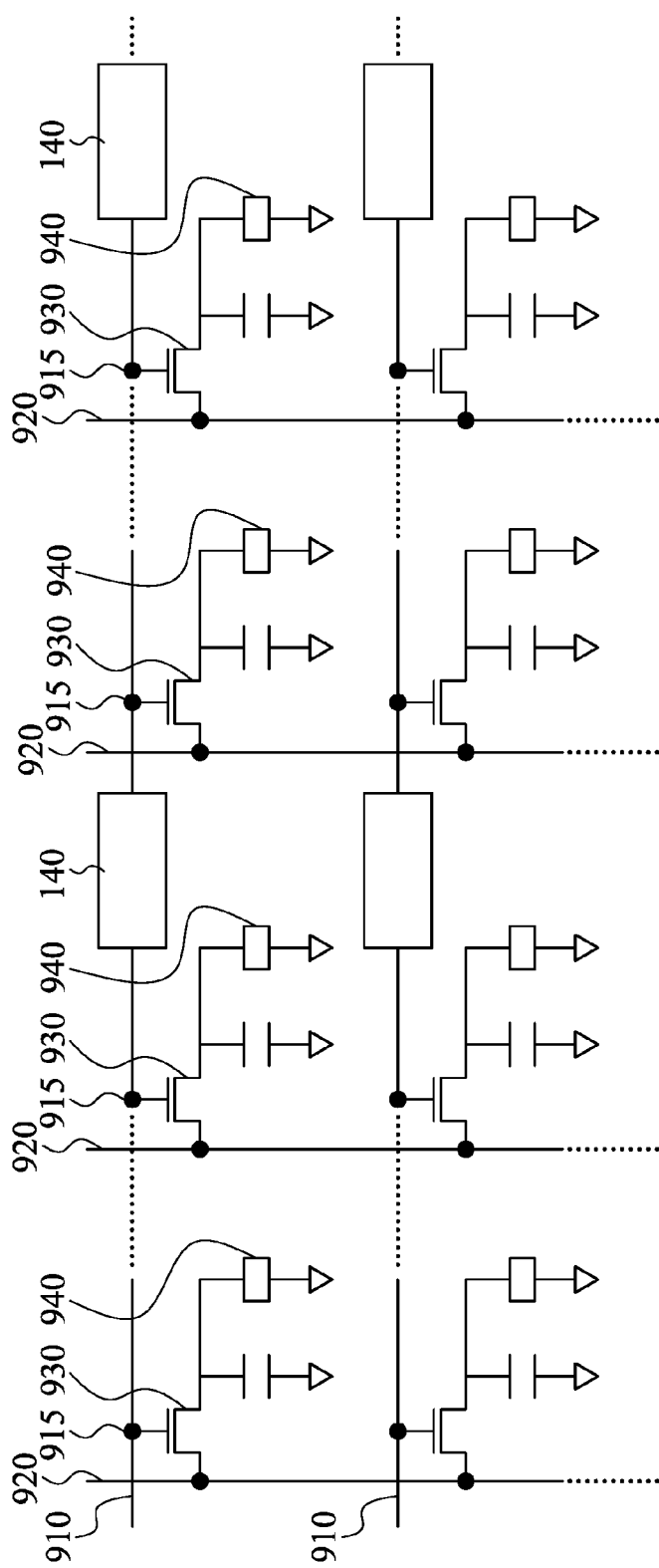
FIG. 5 is a schematic diagram of a circuit of the display panel according to the implementation of the present invention.

FIG. 5 is a schematic diagram of a circuit of the display panel 100 according to the implementation of the present invention. As shown in FIG. 5, the display panel 100 further includes scan lines 910, data lines 920, active elements 930, and pixel electrodes 940. Each of the active elements 930 may be a transistor, and is electrically connected to a scan line 910, a data line 920, and a pixel electrode 940. The active element 930 is electrically connected to a connection point 915 of the scan line 910. The integrated circuit 140 is disposed between the connection points 915. The integrated circuit 140 is electrically connected to adjacent connection points 915. Specifically, the integrated circuit 140 may be a buffer circuit and is configured to enhance signals of the scan lines 910.

It should be understood that the specific implementation of the display panel 100 illustrated above is merely illustrative, and in another implementation, the integrated circuit 140 may be replaced by integrated cabling.

By means of the first width W1, the second width W2, and the third width W3 in an ascending order, the naked eye can hardly distinguish differences between different portions of the black matrix 120. Meanwhile, the widths of the first sub-portion 122, the second sub-portion 124, and the third sub-portion 126 are greater than a general width of the black matrix 120, and therefore, an electronic element with a relatively large volume (for example, the integrated circuit 140) can be disposed below the first sub-portion 122, the second sub-portion 124, or the third sub-portion 126 without affecting a display effect, thereby enabling electronic elements on the substrate 110 to be configured more flexibly. Meanwhile, many electronic elements can be configured below the first sub-portion 122, the second sub-portion 124, or the third sub-portion 126, and therefore, the many electronic elements do not have to be disposed on a bezel of the display panel 100, so that the display panel 100 may be implemented as a narrow bezel display panel or a bezel-less display panel.

Specifically, the integrated circuit 140 may be a gate driver or a data driver, the gate driver is configured to provide pulses for the pixels 130 to enable and update the pixels 130, and the data driver is configured to provide, when the pixels 130 are updated, pixel data corresponding to the pixels 130. It should be understood that the specific implementations of the integrated circuit 140 described above are merely illustrative, and are not intended to limit the present invention. A person of ordinary skill in the art can flexibly select a specific implementation of the integrated circuit 140 according to actual requirements.

Specifically, the pixels 130 include a plurality of first pixels 131 (in this implementation, the first pixels 131 are the first row pixels), a plurality of second pixels 133 (in this implementation, the second pixels 133 are the second row pixels), and a plurality of third pixels 135 (in this implementation, the third pixels 135 are the third row pixels). The first pixels 131, the second pixels 133, and the third pixels 135 are disposed side by side along the first direction H. The first pixels 131 are disposed at one side of the first sub-portion 122, the second pixels 133 are disposed at one side of the second sub-portion 124, and the third pixels 135 are disposed at one side of the third sub-portion 126. The first pixels 131 have a fourth width W4 along the first direction H, the second pixels 133 have a fifth width W5 along the first direction H, and the third pixels 135 have a sixth width W6 along the first direction H. The fourth width W4, the fifth width W5, and the sixth width W6 are in an ascending order. The first pixels 131, the second pixels 133, and the third pixels 135 may be sequential and adjacent pixels, or other pixels may exist between the first pixels 131, the second pixels 133, and the third pixels 135.

Figure 4:
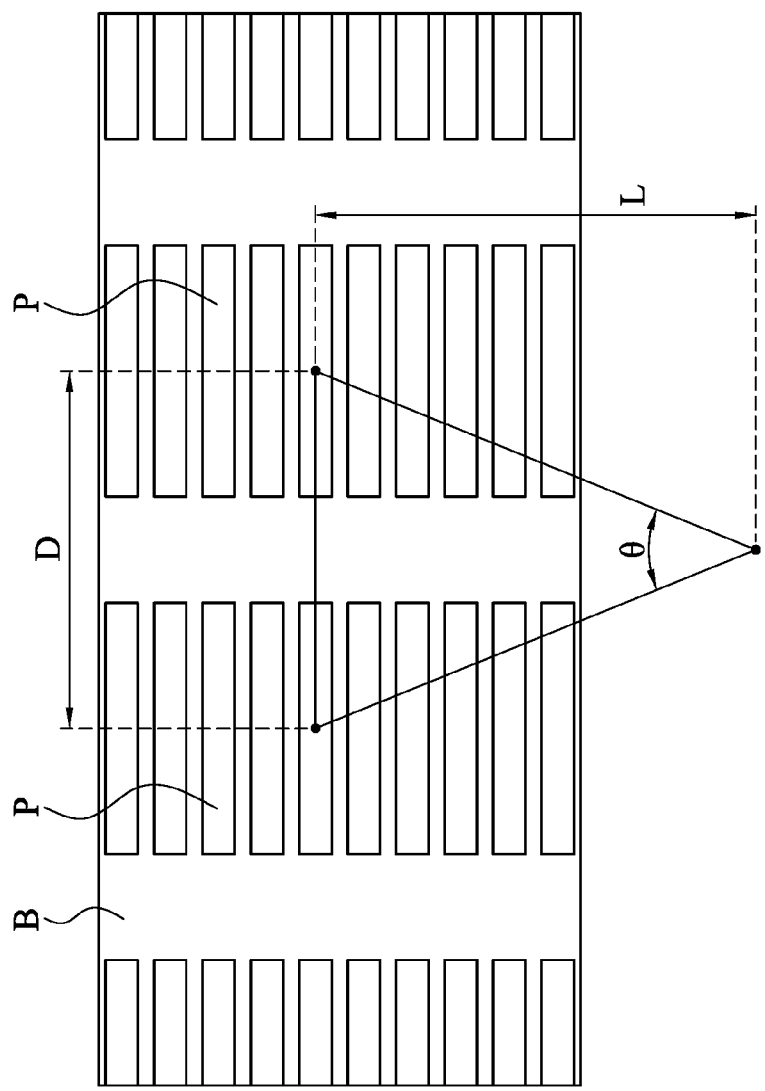
FIG. 4 is a schematic diagram of a distance between centers of pixels, a viewing distance, and an angular resolution.

FIG. 4 is a schematic diagram of a distance D between centers of pixels P, a viewing distance L, and an angular resolution θ, where B is a black matrix, and P is a pixel. As shown in FIG. 4, in accordance with the Rayleigh criterion, in a case in which the viewing distance L is fixed, the greater the distance D between centers of the pixels is, the larger the angular resolution θ is (θ=tan θ). In other words, due to the diffraction effect of light, the greater widths of the pixels P (that is, the greater distance D between centers of the pixels) makes it harder for the naked eye to distinguish an object located between two pixels P.

As shown in FIG. 2 and FIG. 3, in the foregoing implementation, the object between two pixels is the first sub-portion 122, the second sub-portion 124, or the third sub-portion 126 of the black matrix 120. Because the first width W1 of the first sub-portion 122, the second width W2 of the second sub-portion 124, and the third width W3 of the third sub-portion 126 are in an ascending order, if the fourth width W4 of the first pixels 131, the fifth width W5 of the second pixels 133, and the sixth width W6 of the third pixels 135 are in an ascending order accordingly, in a case in which the distances between centers of pixels increase with the increase in the widths of pixels, the angular resolution è also increases. Therefore, the naked eye can hardly distinguish the first sub-portion 122, the second sub-portion 124, or the third sub-portion 126 having a relatively large width.

For example, in a case in which the distance D between centers of pixels is 1180 im, and the viewing distance L is 2 m, it can be known from experiments that if the width of the first sub-portion 122, the second sub-portion 124, or the third sub-portion 126 is less than 270 im, the naked eye can hardly distinguish the first sub-portion 122, the second sub-portion 124, or the third sub-portion 126.

Besides, aperture ratios of the first pixels 131, the second pixels 133, and the third pixels 135 are the same (the aperture ratio is defined as a ratio of a light-transmitting area in a pixel other than a wire distribution area and a transistor area to a total area of the pixel, or a ratio of a light-transmitting or light-emitting area in a pixel to a total area of the pixel). By means of the identical aperture ratios of different pixels, brightness received by the naked eye per unit area is substantially the same for different portions of the display panel 100, and therefore, brightness unevenness of the display panel 100 is not observed by the naked eye.

In this implementation, the first sub-portion 122, the second sub-portion 124, the third sub-portion 126, the first pixels 131, the second pixels 133, and the third pixels 135 are disposed at a relatively central area of the display panel 100, but the present invention is not limited thereto. In another implementation, the first sub-portion 122, the second sub-portion 124, the third sub-portion 126, the first pixels 131, the second pixels 133, and the third pixels 135 may be disposed at an edge area of the display panel 100.

Figure 6:
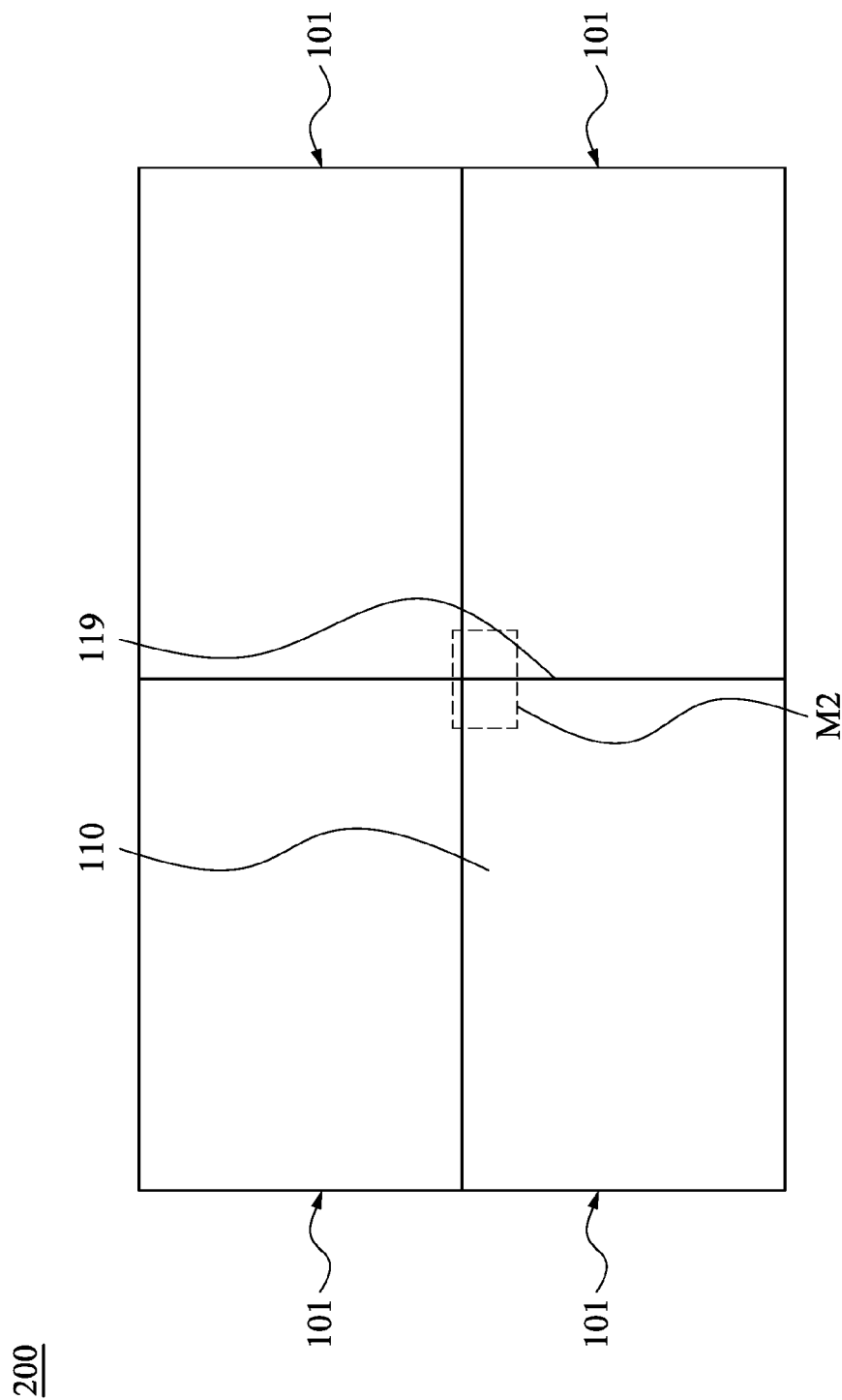
FIG. 6 is a top view of a display panel according to another implementation of the present invention.
Figure 7:
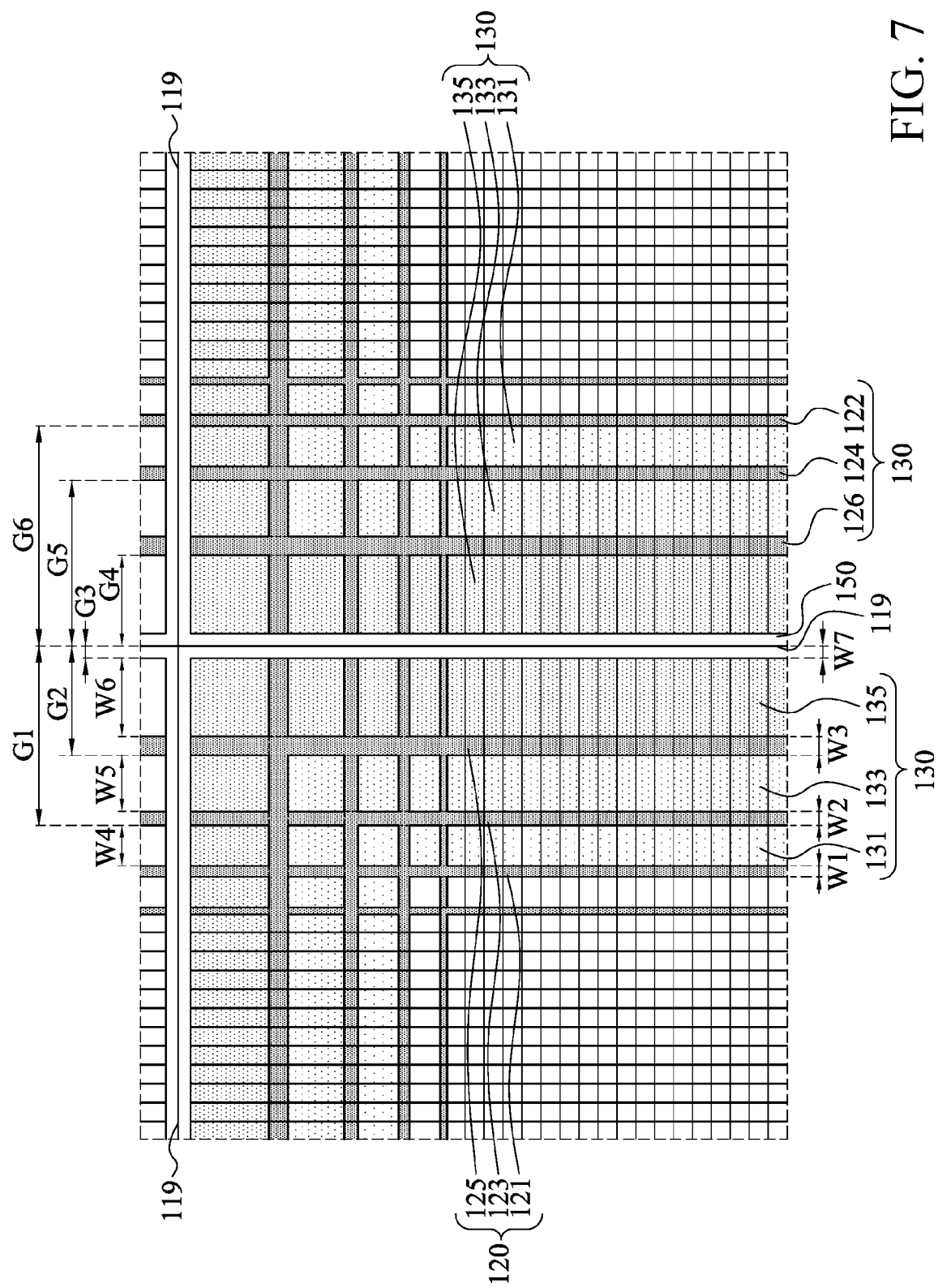
FIG. 7 is a top view of a portion M2 of the display panel according to FIG. 6.

FIG. 6 is a top view of a display panel 101 according to another implementation of the present invention. FIG. 7 is a top view of a portion M2 of the display panel 101 according to FIG. 6. The following mainly introduces differences between the display panel 101 of this implementation and the aforementioned display panel 100. Besides, in this implementation, the display panel 101 may be a narrow bezel display panel.

As shown in FIG. 6 and FIG. 7, a plurality of display panels 101 is arrayed to form a display wall 200. In other words, the display wall 200 includes a plurality of display panels 101.

Specifically, a substrate 110 of a display panel has edges 119 (including horizontal edges 119 and vertical edges 119). A first distance G1 exists between a first pixel 131 and an edge 119 (including horizontal edges 119 and vertical edges 119), a second distance G2 exists between a second pixel 133 and the edge 119 (including horizontal edges 119 and vertical edges 119), and a third distance G3 exists between a third pixel 135 and the edge 119 (including horizontal edges 119 and vertical edges 119), the first distance G1, the second distance G2, and the third distance G3 are in a descending order (to provide clear identification, dots with different densities are separately used to identify the first pixels 131, the second pixels 133, and the third pixels 135, the densities of the dots for identifying the first pixels 131, the second pixels 133, and the third pixels 135 are in an ascending order).

In this implementation, some of the first pixels 131 are arranged as a column, some of the first pixels 131 are arranged as a row, some of the second pixels 133 are arranged as a column, some of the second pixels 133 are arranged as a row, some of the third pixels 135 are arranged as a column, and some of the third pixels 135 are arranged as a row. A person skilled in the art may understand that the column and the row herein do not refer to that elements of a column or a row shall be completely located at a same straight line.

Further, in a first pixel 131, a second pixel 133, and a third pixel 135 that are located in a same column or a same row, an area of the first pixel 131 is less than an area of the second pixel 133, and an area of the second pixel 133 is less than an area of the third pixel 135.

Specifically, in this implementation, the black matrix 120 includes a first portion 121, a second portion 123, and a third portion 125. The first portion 121 is disposed at one side of the first pixels 131, the second portion 123 is disposed at one side of the second pixels 133, the third portion 125 is disposed at one side of the third pixels 135, the first portion 121 has a first width W1, the second portion 123 has a second width W2, the third portion 125 has a third width W3, and the first width W1, the second width W2, and the third width W3 are in an ascending order.

More specifically, the first portion 121 is L-shaped (all the first pixels 131 form an L shape, for example, the L shape filled with a same material in FIG. 7, the first portion 121 is disposed at one side of the first pixels 131, and may be adjacent to the first pixels 131, and therefore, the first portion 121 is also L-shaped), the second portion 123 is L-shaped (all of the second pixels 133 form an L shape, for example, the L shape filled with a same material in FIG. 7, the second portion 133 may be adjacent to the second pixels 133, the second portion 123 is disposed at one side of the second pixels 133, and therefore, the second portion 123 is also L-shaped), and the third portion 125 is L-shaped (all of the third pixels 135 form an L shape, for example, the L shape filled with a same material in FIG. 7, the third portion 125 is disposed at one side of the third pixels 135, and may be adjacent to the third pixels 135, and therefore, the third portion 125 is also L-shaped). Further, two arms of each L (that is, the first portion 121, the second portion 123, and the third portion 125) have a same width.

In addition, as shown in FIG. 7, the first sub-portion 122, the second sub-portion 124, and the third sub-portion 126 of the black matrix 120 and the first portion 121, the second portion 123, and the third portion 125 of the black matrix 120 separately represent two different area division manners of the black matrix 120. In other words, the black matrix 120 may be divided into the first sub-portion 122, the second sub-portion 124, and the third sub-portion 126 or be divided into the first portion 121, the second portion 123, and the third portion 125. In addition, the first width W1 of the first portion 121 is the same as the first width W1 of the first sub-portion 122, the second width W2 of the second portion 123 is the same as the second width W2 of the second sub-portion 124, and the third width W3 of the third portion 125 is the same as the third width W3 of the third sub-portion 126.

Further, the display panel 101 has a bezel area 150, the bezel area 150 has a seventh width W7, and the seventh width W7 is a half of the third width W3.

Therefore, as shown in FIG. 5 and FIG. 6, a distance between adjacent display panels 101 is two times the seventh width W7 (two times the width of the bezel area 150). Therefore, in a case that the widths of the first portion 121, the second portion 123, and the third portion 125 of the black matrix 120 and the widths of the first pixels 131, the second pixels 133, and the third pixels 135 are correspondingly designed, the naked eye can hardly distinguish the first portion 121, the second portion 123, and the third portion 125 with relatively large widths. Meanwhile, the distance between adjacent display panels 101 is substantially the same as the third width W3 of the third portion 125, and therefore, the diffraction effect generated by the third pixels 135 of two adjacent display panels causes difficulties for the naked eye to distinguish the bezel areas 150 of the adjacent display panels 101. Therefore, because the naked eye can hardly distinguish the bezel areas 150 of the display panels 101, the display wall 200 looks more like an integral portion than a plurality of different divided portions.

Figure 8:
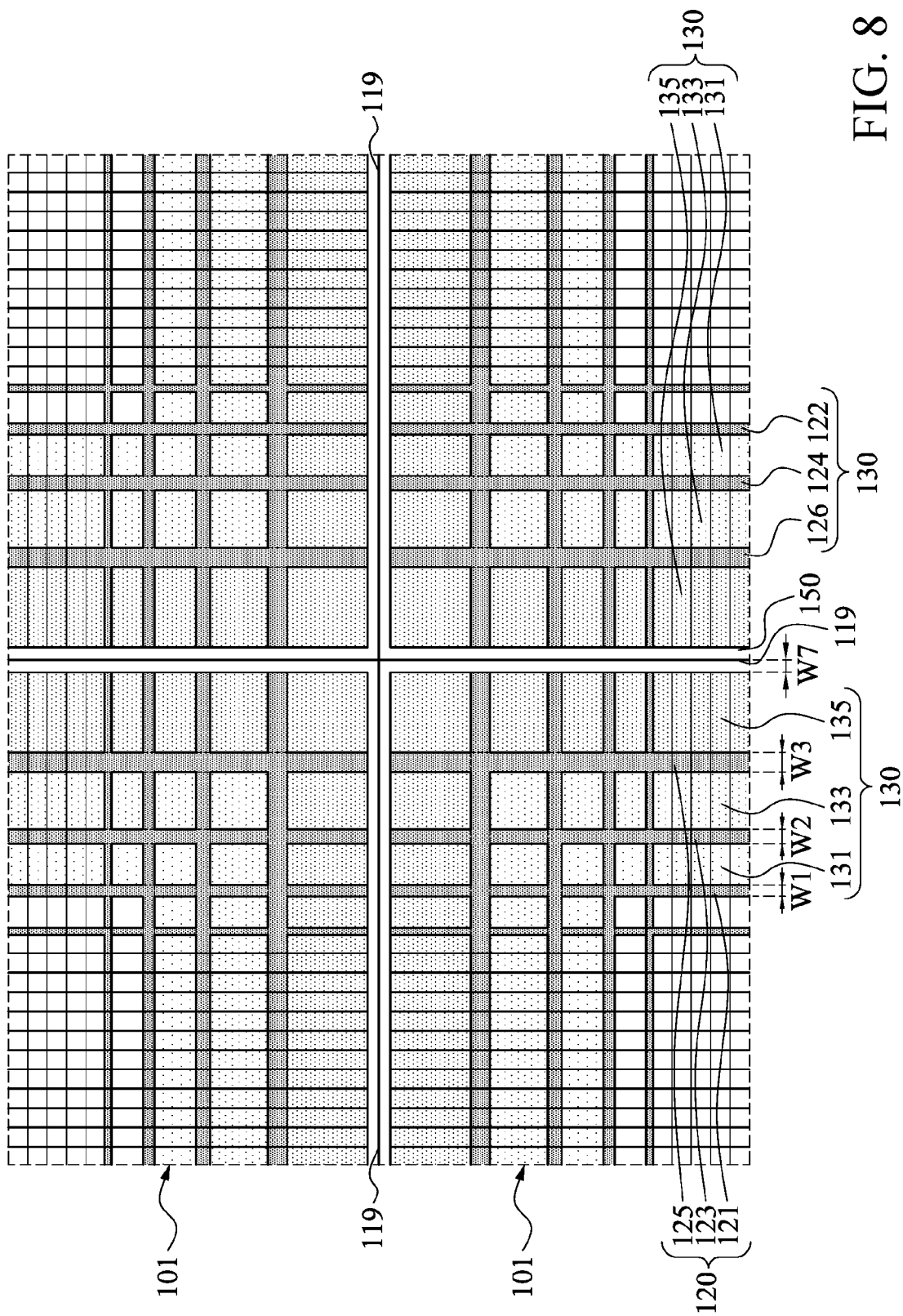
FIG. 8 is a top view of another portion of the display panel according to FIG. 6.
Figure 9:
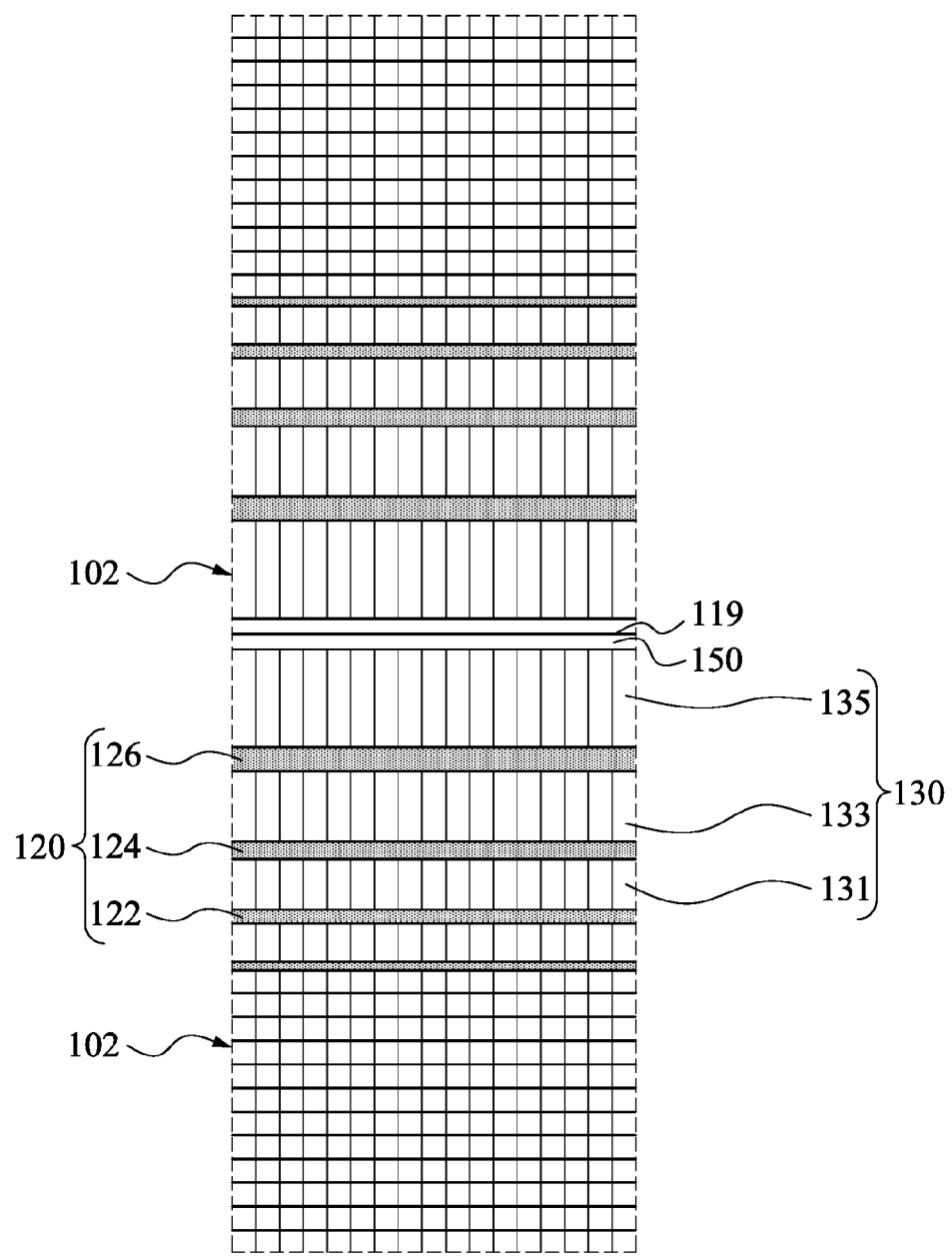
FIG. 9 is a top view of a portion of a display panel according to still another implementation of the present invention.

FIG. 8 is a top view of another portion of the display panel 101 according to FIG. 6. As shown in FIG. 8, the foregoing paragraphs mainly discuss an integral visual effect that can be generated by two display panels 101 horizontally disposed side by side, but two display panels 101 vertically disposed side by side in FIG. 8 can generate a same integrated visual effect. However, the present invention is not limited thereto. FIG. 9 is a top view of a portion of a display panel 102 according to still another implementation of the present invention. As shown in FIG. 9, the foregoing mechanism may be adapted to a display 201 formed by two display panels 102 that are vertically disposed side by side. Alternatively, in another implementation, the foregoing mechanism may be adapted to a display formed by two display panels that are horizontally disposed side by side.

Specifically, referring to FIG. 7, a sixth distance G6 exists between the first sub-portion 122 and the vertical edge 119, a fifth distance G5 exists between the second sub-portion 124 and the vertical edge 119, a fourth distance G4 exists between the third sub-portion 126 and the vertical edge 119, and the sixth distance G6, the fifth distance G5, and the fourth distance G4 are in a descending order.

Specifically, the third pixels 135 are pixels in all the pixels 130 nearest to the edges 119.

Specifically, the integrated circuit 140 (see FIG. 3) is disposed below the first portion 121, the second portion 123, or the third portion 125, and the integrated circuit 140 is electrically connected to at least one of the pixels 130.

It should be understood that the foregoing specific implementation of the display panel 100 are merely illustrative, and in another implementation, the integrated circuit may be replaced by integrated cabling.

In the foregoing implementation of the present invention, by means of enabling the first width W1, the second width W2, and the third width W3 to be in an ascending order, the naked eye can hardly distinguish differences between different portions of the black matrix 120. Meanwhile, the widths of the first sub-portion 122, the second sub-portion 124, and the third sub-portion 126 are greater than the general width of the black matrix 120, and therefore, an electronic element (for example, the integrated circuit 140) with a relatively large volume may be disposed below the first sub-portion 122, the second sub-portion 124, or the third sub-portion 126 without affecting a display effect. Therefore, electronic elements can be configured on the substrate 110 more flexibly. Meanwhile, many electronic elements can be configured below the first sub-portion 122, the second sub-portion 124, or the third sub-portion 126, and therefore, the many electronic elements do not have to be disposed on a bezel of the display panel 100, so that the display panel 100 may be implemented as a narrow bezel display panel or a bezel-less display panel.

Further, when the display panels 100 are used to form the display wall 200, by means of an increase in the widths of pixels (for example, third pixels 135) adjacent to the bezel areas 150, a diffraction effect generated by the third-pixels 135 adjacent to the bezel areas of two adjacent display panels 100 causes difficulties for the naked eye to distinguish the bezel areas 150 of the adjacent display panels 100. Therefore, because the naked eye can hardly distinguish the bezel areas 150 of the display panels 100, the display wall 200 looks more like an integral portion than a plurality of different divided portions.

Although the present invention is described above by means of the implementations, the above description is not intended to limit the present invention. A person skilled in the art can make various variations and modifications without departing from the spirit and scope of this disclosure, and therefore, the protection scope of the present invention is as defined in the appended claims.

What is claimed is:

1. A display panel, comprising: a substrate, having an edge:
    a plurality of pixels, disposed on the substrate, wherein the pixels comprise a plurality of first row pixels, a plurality of second row pixels, and a plurality of third row pixels disposed side by side, and a first distance between the first row pixels and the edge, a second distance between the second row pixels and the edge, and a third distance between the third row pixels and the edge are in a descending order: and
    a black matrix, disposed between the pixels, wherein the black matrix comprises a first sub-portion, a second sub-portion, and a third sub-portion disposed side by side, the first row pixels are disposed at one side of the first sub-portion, the second row pixels are disposed at one side of the second sub-portion, the third row pixels are disposed at one side of the third sub-portion, a fourth distance exists between the third sub-portion and the edge, a fifth distance exists between the second sub-portion and the edge, and a sixth distance exists between the first sub-portion and the edge, and the sixth distance, the fifth distance and the fourth distance are in a descending order, wherein
    the first sub-portion has a first width, the second sub-portion has a second width, and the third sub-portion has a third width, and the first width, the second width, and the third width are in an ascending order;
    the first row pixels have a fourth width, the second row pixels have a fifth width, the third row pixels have a sixth width, and the fourth width, the fifth width, and the sixth width are in an ascending order;
    wherein the third row pixels are pixels nearest the edge among the first row pixels, the second row pixels, and the third row pixels and aperture ratios of the first row pixels, the second row pixels, and the third row pixels are the same; and
    an integrated circuit disposed on the substrate, and disposed below the first sub portion, the second sub-portion and the third sub-portion, wherein the integrated circuit is electrically connected to at least one of the pixels.

2. The display panel according to claim 1, wherein the integrated circuit is a gate driver or a data driver, the gate driver is configured to provide pulses for the pixels to enable and update the pixels, and the data driver is configured to provide, when the pixels are updated, pixel data corresponding to the pixels.

3. The display panel according to claim 1, wherein a sum of the first width and the fourth width, a sum of the second width and the fifth width, and a sum of the third width and the sixth width are in an ascending order.

4. A display panel, comprising: a substrate, having an edge; and
    a plurality of pixels, disposed on the substrate, wherein the pixels comprise a plurality of first pixels, a plurality of second pixels, and a plurality of third pixels, the first pixels and the second pixels are adjacent, the second pixels and the third pixels are adjacent, a first distance exists between the first pixels and the edge, a second distance exists between the second pixels and the edge, a third distance exists between the third pixels and the edge, the first distance, the second distance, and the third distance are in a descending order: and
    a black matrix, disposed between the pixels, wherein the black matrix comprises a first portion, a second portion, and a third portion, a fourth distance exists between the third portion and the edge, a fifth distance exists between the second portion and the edge, a sixth distance exists between the first portion and the edge, the sixth distance, the fifth distance, and the fourth distance are in a descending order, the first portion is disposed at one side of the first pixels, the second portion is disposed at one side of the second pixels, and the third portion is disposed at one side of the third pixels, wherein the first portion has a first width, the second portion has a second width,
    the third portion has a third width, and the first width, the second width, and the third width are in an ascending order;
    the first pixels have a fourth width, the second pixels have a fifth width, the third pixels have a sixth width, and the fourth width, the fifth width, and the sixth width are in an ascending order; wherein the third pixels are the pixels nearest the edge among the first, the second, and third pixels and aperture ratios of the first pixels, the second pixels, and the third pixels are the same.

5. The display panel according to claim 4, further comprising:
    an integrated circuit, disposed on the substrate, and disposed below the first portion, the second portion, or the third portion, wherein the integrated circuit is electrically connected to at least one of the pixels.

6. The display panel according to claim 5, wherein the integrated circuit is a gate driver or a data driver, the gate driver is configured to provide pulses for the pixels to enable and update the pixels, and the data driver is configured to provide, when the pixels are updated, pixel data corresponding to the pixels.

7. The display panel according to claim 4, wherein the display panel has a bezel area, the bezel area has a seventh width, and the seventh width is a half of the third width.

8. The display panel according to claim 4, wherein the first portion is L-shaped, the second portion is L-shaped, and the third portion is L-shaped, and two arms of each L have a same width.

9. A display wall, comprising:
a plurality of display panels according claim 4, wherein the display panels are arranged in an array to form the display wall.

\* \* \* \* \*